Dec. 21, 1926.

T. H. STEWART

POISON DISTRIBUTOR

Filed Jan. 27, 1925

1,611,388

Inventor
T. H. Stewart.
By
Attorney

Patented Dec. 21, 1926.

1,611,388

UNITED STATES PATENT OFFICE.

THOMAS H. STEWART, OF ATLANTA, GEORGIA.

POISON DISTRIBUTOR.

Application filed January 27, 1925. Serial No. 5,160.

The object of this invention is the provision of an apparatus for dusting plants such as cotton, bean and potato with a poison in the form of a powder of the nature of calcium arsenate, Paris green and the like, the apparatus being of a construction to be readily manipulated by hand.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Corresponding and like parts are referred to in the following description and designated in the several views of the drawing by like reference characters.

Figure 1:
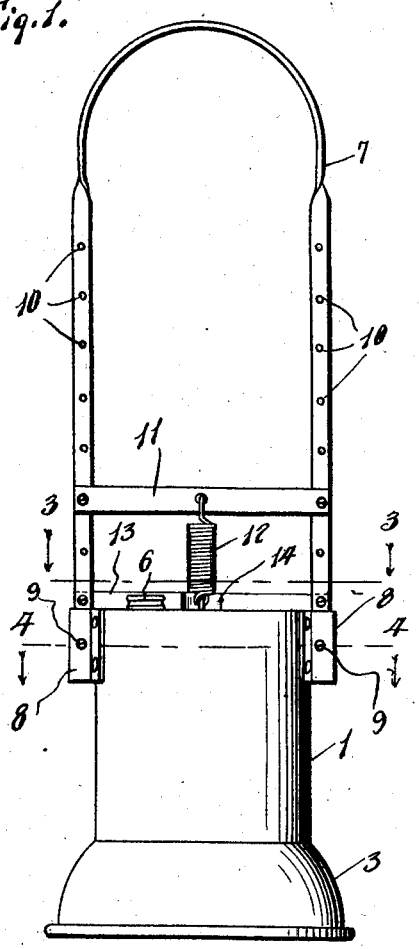
Figure 1 is a side view of a poison distributor embodying the invention.
Figure 2:
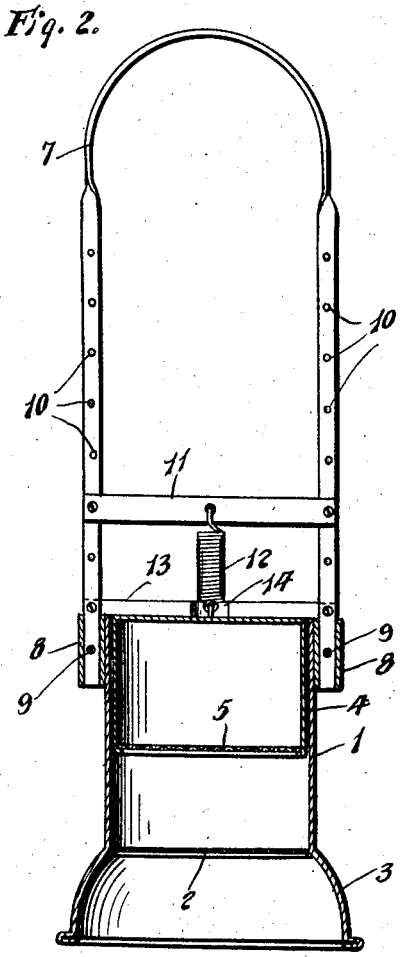
Figure 2 is a vertical central sectional view thereof.
Figure 3:
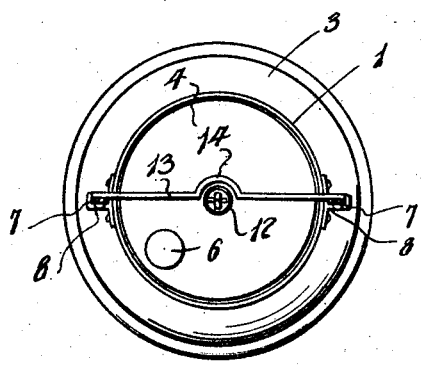
Figure 3 is a horizontal section on the line 3—3 of Figure 1.
Figure 4:
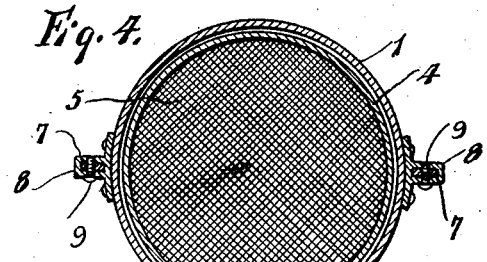
Figure 4 is a similar view on the line 4—4 of Figure 1.

The device comprises a tubular member 1 provided with a perforate bottom 2 preferably of wire gauze. A bell 3 is formed on the lower end of member 1 and provides a guard for receiving the plant when applying the poison thereto so as to prevent waste and scattering thereof by the wind.

A receptacle 4 fits loosely within the upper portion of tubular member 1 and has a perforate bottom 5 also of wire gauze. Receptacle 4 is closed at the top and the latter is provided with a filling opening closed by a cap 6.

A handle 7 is applied to the member 1 and is preferably in the form of a bail and consists of a metal strap doubled upon itself into the form a U and having its legs inserted in keepers 8 at opposite sides of member 1 and secured in the required adjusted position by means of pins 9 which pass through one of a series of openings 10 formed in the legs of the handle and corresponding openings formed in the keepers 8.

A rod 11 is secured above member 1 in alined openings 10 in handle 7 and 12 designates a spring having one end secured to rod 11 and its other end engaging an eye loop secured to the top of receptacle 4. 13 designates another rod secured in other openings 10 in handle 7 and serves as a stop to limit the upward movement of receptacle 4 under the impulse of spring 12, said rod 13 having an offset portion 14 to prevent interference with the action of spring 12.

In use the device is loaded with the poison powder through the filling opening closed by cap 6, the gauze bottom 5 of receptacle 4 being of a mesh fine enough to prevent the powder running through. By holding the distributor over the plant to be treated and moving it up and down the receptacle is given a vertical movement under impulse of said movement counteracted by the action of spring 12 to cause the receptacle 4 to engage stop rod 13 and to agitate the powder to dispense a small quantity during each operation from the receptacle and through the gauze bottom 5.

What is claimed is:—

1. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member, a handle attached to the tubular member, and a tension spring attached to said receptacle and extended through the top of said tubular member and connected with said handle, and a stop arresting the upward movement of the receptacle.

2. An apparatus for supplying a powdered insecticide to plants, having in combination a tubular member open at its upper and lower ends and provided at lower end with a perforate bottom and an extended guard, a receptacle closed at its sides and top and having a reticulated bottom and fitted and vertically movable within the tubular member and having a filling opening accessible through the open end of the tubular member, a handle attached to the tubular member, and a tension spring attached to said receptacle and extended through the top of said tubular member and connected with said handle, and a stop arresting the upward movement of the receptacle.

3. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member and having a filling opening accessible through the open end of the tubular member, a handle attached to the tubular member, a tension spring attached to said receptacle and extended through the top of said tubular member and connected with said handle, and a stop arresting the upward movement of the receptacle, said handle having means for vertical adjustment on the tubular member and means for adjusting the tension of said spring.

4. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member and having a filling opening accessible through the open end of the tubular member, a handle attached to the tubular member, a tension spring attached to said receptacle and extended through the top of said tubular member and connected with said handle, and a stop arresting the upward movement of the receptacle, said handle having a cross bar for the attachment of the upper end of said spring.

5. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member and having a filling opening accessible through the open end of the tubular member, a handle attached to the tubular member, a tension spring attached to said receptacle and extended through the top of said tubular member, a cross bar vertically adjustable on the handle and connected with the upper end of the spring, and a stop arresting the upward movement of the receptacle.

6. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member and having a filling opening accessible through the open end of the tubular member, a handle attached to the tubular member, a tension spring attached to said receptacle and extended through the top of said tubular member and connected with said handle, and a cross bar on the handle forming a stop arresting the upward movement of the receptacle, said tubular member and handle and cross bar and connection for the upper end of the spring having means for relative vertical adjustment.

7. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member and having a filling opening accessible through the open end of the tubular member, a handle having legs, keepers on the tubular member in which the legs of the handle are vertically adjustable, a tension spring attached to said receptacle and extended through the top of said tubular member and connected with said handle, and a stop arresting the upward movement of the receptacle.

8. An apparatus for supplying a powdered insecticide to plants, having in combination a tubular member open at its upper and lower ends and provided at its lower end with a perforate bottom and an extended guard, a receptacle closed at its sides and top and having a reticulated bottom and fitted and vertically movable within the tubular member, a handle having legs with perforations 10, a tension spring attached to said receptacle and extended through the top of said tubular member and connected with said handle, and a stop arresting the upward movement of the receptacle, said tubular member having perforated keepers in which said legs are vertically adjustable, and having perforated cross bars 11 and 13 adjustable on said legs and serving respectively as the connection for the upper end of the spring and as said stop for the receptacle.

In testimony whereof I affix my signature.

THOMAS H. STEWART.